United States Patent
Babitch et al.

[11] Patent Number: 5,930,719
[45] Date of Patent: Jul. 27, 1999

[54] DATA AND VOICE CORDLESS TELEPHONE SYSTEM

[75] Inventors: Daniel Babitch, San Jose; Andrew G. Varadi, Saratoga; James Wong, San Francisco, all of Calif.

[73] Assignee: Wireless Logic, Inc., San Jose, Calif.

[21] Appl. No.: 08/715,938

[22] Filed: Sep. 19, 1996

[51] Int. Cl.[6] ............................. H04B 1/38; H04M 11/00
[52] U.S. Cl. ...................... 455/462; 455/557; 375/222
[58] Field of Search ................................... 455/403, 418, 455/462, 465, 557; 375/220, 222

[56] References Cited

U.S. PATENT DOCUMENTS

| | | | |
|---|---|---|---|
| 4,578,537 | 3/1986 | Faggin et al. | 179/2 |
| 4,661,659 | 4/1987 | Nishimura | 379/61 |
| 4,991,197 | 2/1991 | Morris | 379/58 |
| 5,023,903 | 6/1991 | Bowen | 379/67 |
| 5,065,427 | 11/1991 | Godbole | 379/100 |
| 5,127,050 | 6/1992 | Takahashi et al. | 379/428 |
| 5,168,516 | 12/1992 | Ito | 379/58 |
| 5,193,110 | 3/1993 | Jones et al. | 379/94 |
| 5,327,483 | 7/1994 | Kikuchi | 379/61 |
| 5,400,327 | 3/1995 | Dezonno | 370/62 |
| 5,473,676 | 12/1995 | Frick et al. | 375/222 |
| 5,483,576 | 1/1996 | Staples | 375/222 |
| 5,512,898 | 4/1996 | Norsworthy et al. | 341/155 |
| 5,657,371 | 8/1997 | Suomi et al. | 455/418 |
| 5,696,699 | 12/1997 | Nair | 455/422 |

*Primary Examiner*—Andrew M. Dolinar
*Attorney, Agent, or Firm*—Thomas E. Schatzel; Law Offices of Thomas E. Schatzel, A Prof. Corporation

[57] ABSTRACT

A cordless system comprises a laptop computer with a modem connected to a modem data port on a cordless telephone handset. A direct sequence spread spectrum RF link is established between the cordless telephone handset and a base station. Both the telephone network and a desktop computer with a modem are connected to the base station. When the cordless telephone handset detects that the laptop computer wants to go off-hook, a selection signal is also sent by the cordless telephone handset to the base station to indicate whether the call is to be directed to the telephone network or the desktop computer. When the base station detects that the desktop computer wants to go off-hook, a selection signal is also sent by the desktop computer to the base station to indicate whether the call is to be directed to the telephone network or over the RF link to the laptop computer. Incoming calls from the telephone network are directed to the desktop computer by the base station with a ring indication going to the cordless telephone handset. If the laptop computer answers the ringing, the cordless telephone handset indicates an off-hook condition to the base station and the base station routes the incoming call over the RF link to the cordless telephone handset and the laptop computer.

13 Claims, 2 Drawing Sheets

DATA AND VOICE CORDLESS TELEPHONE SYSTEM

BACKGROUND OF THE PRESENT INVENTION

1. Field of the Present Invention

The present invention relates generally to radio communication methods and systems and more specifically to analog narrow-band and spread spectrum wireless data links with interface to the public switched telephone network.

2. Description of the Prior Art

Cordless, or wireless, telephones have become very popular over the years. Analog narrow-band cordless telephone sets generally give satisfactory service within residential homes, and the more recent 900 MHz direct sequence spread spectrum (DSSS) and frequency hopping wireless equipment have extended the useful range and improved the signal quality for consumers. Many wireless data links are now also popular and are used to interface accessories to the serial ports of personal computers. But such interfacing can be inconvenient if the computer's serial port needs to be used for other devices too. So, most small computers being sold now have internal modems installed and this makes it more convenient to use the modem signal, rather that the serial digital signal, in any wireless link to other equipment.

Cordless telephone use has generally been limited in the prior art to voice communications, especially in the untethering of individual subscribers from the constraints of their wallphone or corded desk phone placements.

Portable laptop computers are now universally equipped or compatible with modems that can dial out and automatically answer calls too. Connecting a telephone cord to a battery operated laptop computer for telephone network access is also ubiquitous, but this seems odd to leash a user's freedom this way. So it now has also developed that cellular phones and maybe even cordless phones have been connected to or incorporated within laptops to once again set the user free to roam about without the limitations of wires.

Users of laptop computers very often have larger desktop computers too. So it frequently happens that such users would like to transfer a data file from one to the other. Such transfers can be done by floppy disk, if the disk systems are compatible. Or the data file transfer can be done by a wired link between the desktop and the laptop computers, but if the laptop and desktop are not very close to each other, this would usually involve the use of modems and the telephone network.

SUMMARY OF THE PRESENT INVENTION

It is therefore an object of the present invention to provide a wireless system that can provide data communication with a local base station connected to the telephone network and which uses modem signals already generated and received by computers.

It is another object of the present invention to provide a method for connecting a laptop computer and a portable wireless unit to either the telephone network or a computer and modem connected to a wireless base station.

Briefly, a system of the present invention comprises a laptop computer with a modem connected to a modem data port on a wireless transceiver. A cordless telephone handset is an example of a portable wireless unit, and other implementations with or without voice capability are possible. A direct sequence spread spectrum radio frequency (RF) link is established between the cordless telephone handset and a base station. A fast-frequency-hopping spread spectrum system can alternatively be used. In either case, the present invention uses analog modulation of information to carry the modem signal over the wireless link. The present invention is not limited to any particular type of duplexing. Both the telephone network and a desktop computer with a modem are connected to the base station. When the cordless telephone handset detects that the laptop computer wants to go off-hook, a selection signal is also sent by the cordless telephone handset to the base station to indicate whether the call is to be directed to the telephone network or the desktop computer. When the base station detects that the desktop computer wants to go off-hook, a selection signal is also sent by the desktop computer to the base station to indicate whether the call is to be directed to the telephone network or over the RF link to the laptop computer. Incoming calls from the telephone network are directed to the desktop computer by the base station with a ring indication going to the cordless telephone handset. If the laptop computer answers the ringing, the cordless telephone handset indicates an off-hook condition to the base station and the base station routes the incoming call over the RF link to the cordless telephone handset and the laptop computer.

The present invention includes the use of an echo canceller and automatic gain control at the telephone line interface to maximize the dynamic range and signal-to-noise ratio of the wireless link analog modulation. Without such, the modem could still function, but the radio would distort the signal received from the telephone line, and the modem would be prevented from providing good data quality and the lowest error rates.

An advantage of the present invention is that the link can carry a modem signal with the highest possible data rate and lowest bit error rate.

Another advantage of the present invention is that analog modulation can faithfully reproduce a modem signal over a wireless link without the expense and limitations of digital modulation.

A still further advantage of the present invention is that the use of analog modulation provides a method to carry a modem signal directly through the wireless link and onto a telephone line, whereas digital modulation would require a modem at the telephone line interface which is less economical.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a wireless communication system embodiment of the present invention;

FIG. 2 schematically illustrates a cordless handset embodiment of the present invention;

FIG. 3 is a schematic of a base station embodiment of the present invention; and FIG. 4 is a schematic of a base interface unit embodiment of the present invention.

DETAILED DESCRIPTION OF THE PREFERRED EMBODIMENTS

Figure 1:
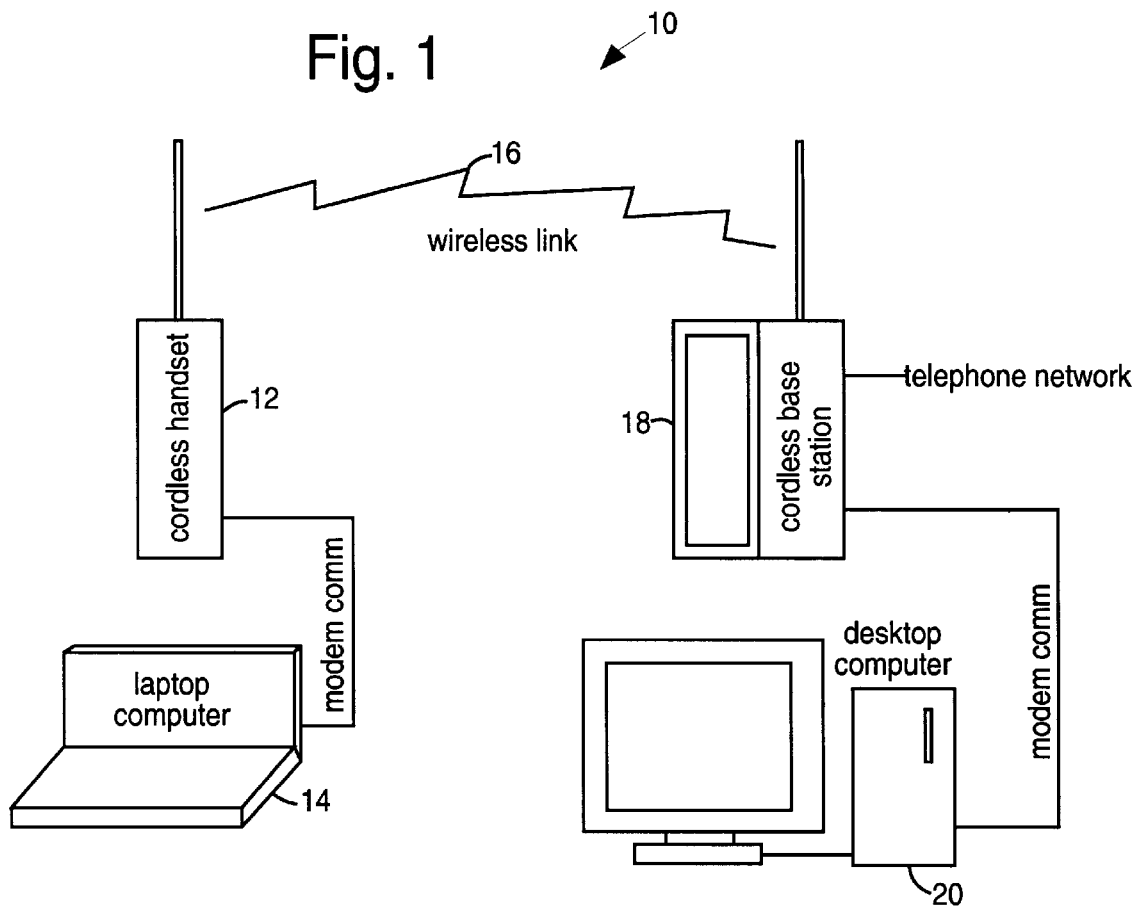

FIG. 1 illustrates a wireless communication system embodiment of the present invention, referred to herein by the general reference numeral 10. The system 10 comprises a cordless handset 12 with a data port for connection to a laptop computer 14, and a wireless RF link 16 connects to a cordless base station 18. Both the worldwide public switched telephone network (PSTN) and a desktop computer 20 are preferably connected to the cordless base station 18. The RF link 16 can be any suitable service compatible with cordless telephone use, e.g., analog 900-MHz narrow-band or 900-MHz direct sequence spread spectrum (DSSS) or fast frequency hopping with analog modulation of information. The use of analog modulation with direct sequence spreading has been used and taught commonly in industry. The use of analog modulation is critical in our invention to preserve modem signal compatibility. Digital modulation is a disadvantage when dealing with a modem signal because it converts from analog to digital domain and back again, and each unnecessary conversion can make extra noise and distortion, or add more cost to the design. The cordless handset 12 and the base station 18 allow the laptop computer 14 a choice of connections, e.g., either to the telephone network or to the desktop computer 20. In another embodiment, the link would handle data only and all voice switching and processing elements would be removed. In yet another embodiment there would be only a connection to the telephone line at one end or connection to a desktop computer. Similarly, the base station 18 allows the desktop computer 20 a choice of connections, e.g., either to the telephone network or to the handset 12. For incoming calls from the telephone network, the base station 18 allows a choice of connections to either the laptop computer 14 through the cordless handset 12 or to the desktop computer 20 connected by a cord.

Modem data connections involving the telephone network require certain functions, namely near-end echo cancellation and automatic gain control, to be performed. All modern modems have these functions. In addition, the radio link also has certain requirements which are necessary to good operation. If, as in the present invention, one end of a radio link is attached to the telephone network, then it is critically necessary for the radio to perform echo cancellation and automatic gain control at the telephone interface. If this is not done, the signal to noise and distortion of the radio will suffer, and the data rate will slow down severely. The modem cannot undo the problems which the radio will cause if echo cancellation and automatic gain control are not done between the base station radio and the telephone network.

In all embodiments of the present invention, the RF link 16 has a conventional three KHz analog phone bandwidth, approximately 0.3 to 3.4 KHz, to preserve backward compatibility with conventional telephone equipment and methods. One consequence of such a provision is that features common to corded phones can be straightforwardly incorporated in cordless phones such as the cordless handset 12.

In another embodiment of the present invention, the desktop computer 20 includes the functionality of an answering machine. For example, incoming calls have their number of rings counted and if not picked up before, the desktop computer 20 takes the line off-hook and sends out a greeting message to the incoming telephone network via the base station 18. Any message is recorded by accepting analog voice signals to the desktop computer 20 and there the messages are stored digitally on disk. At least this much of such a system can be constructed using conventional parts and methods. The desktop computer 20 is further provided with software responsive to the cordless handset 12 such that the existence of pending messages and their playback can be facilitated remotely through the cordless handset 12.

In yet another embodiment of the present invention, the desktop computer 20 includes the functionality of a dictation machine. For example, the desktop computer 20 is provided with software responsive to the cordless handset 12 such that dictation can be accepted from and played back to the cordless handset 12. Intermediate editing and storage of the dictation is done with the hard disk in the desktop computer 20.

In still another embodiment of the present invention, the desktop computer 20 includes the functionality of an audio e-mail center. For example, the desktop computer 20 is provided with software responsive to the cordless handset 12 such that digitally received e-mail messages received over internet and other kinds of networks connected to the desktop computer 20 can be read aloud over the RF link 16 to the cordless handset 12 by a speech synthesis unit. Intermediate editing and storage of the e-mail is done with the hard disk in the desktop computer 20.

In some of the above embodiments, the laptop computer 14 can be reduced to a simpler "palmtop" device or even combined into the cordless handset 12 with the addition of an adequate display and interface for messages or other information.

Figure 2:
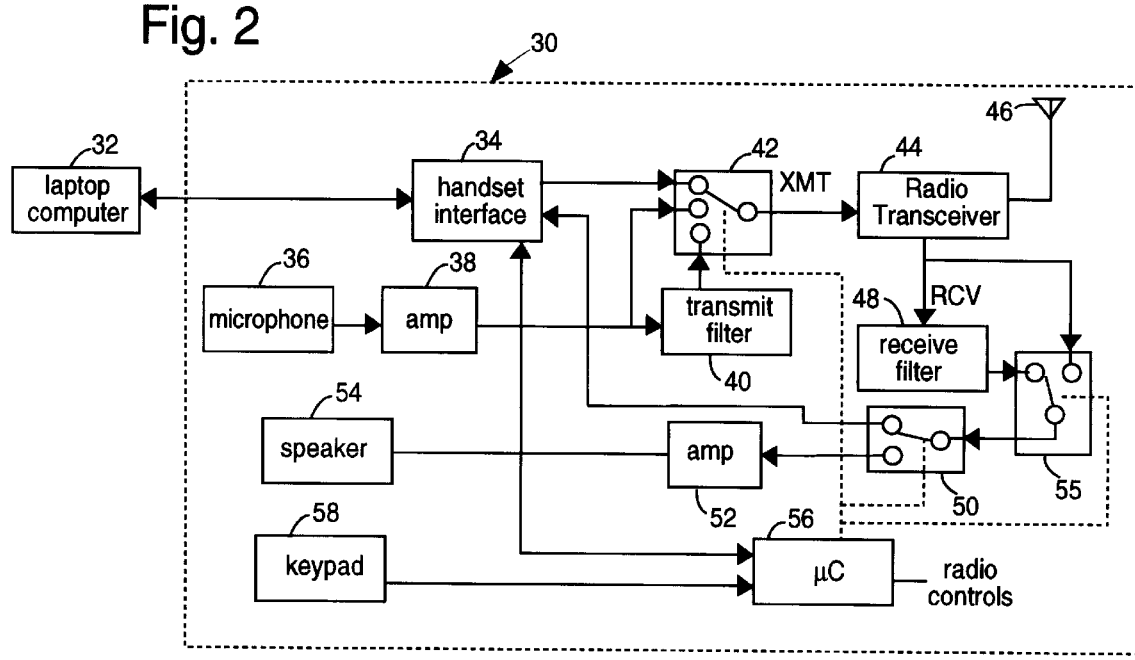

FIG. 2 schematically illustrates a cordless handset embodiment of the present invention, referred to herein by the general reference numeral 30. The cordless handset 30 is similar to the one included in system 10 of FIG. 1. A laptop computer 32 connects to a handset interface 34, e.g., with a standard 4-wire modular telephone cord with RJ-11 type jacks on each end. Voice is input by a microphone 36 connected to an amplifier 38. A transmit filter 40 conditions the voice signal for transmission. A switch 42 selects whether data or voice is to be transmitted by a radio transceiver 44. An antenna 46 is connected to the radio transceiver 44. A receive filter 48 conditions the signals received over the RF link before being routed by a switch 50 to either the handset interface 34 or a audio power amplifier 52 connected to a speaker 54. The receive filter 48 limits the noise bandwidth of the return radio signal. The receive filter 48 may not be desired or needed if the modem in the laptop has adequate input filtering to handle the received spectrum. In this case [an additional pole to switch 42 could] a switch 55 is added to allow a bypass of the receive filter 48. A microcomputer 56 controls both switches 42 and 50 according to data input by a user at a keypad 58.

Alternatively, switches 42 and 50 could be controlled indirectly from the laptop 32 or the desktop 62 by using either extra communication lines between the laptop 62 and the handset microcomputer 56, and between the desktop computer 62 and the base microcomputer 76 or by using software in the laptop and desktop to generate special voice-band signals which the telephone base and handset recognize as being local data commands to control the call to be either voice or data. Voice-band signaling can travel over the standard RJ-11 telephone interface. One example of commonly used voice-band signaling is the DTMF (dual tone multiple frequency) set used in dialing. A special sequence or digit could be used. Other methods are also commonly used.

The handset interface 34 includes a conventional RJ-11 type telephone jack and is connected to the laptop computer 32 or other portable device. Prior art cordless handsets do not have telephone line interfaces such as this. The handset interface 34 includes circuit devices to generate a holding DC current that is required by conventional modems and is therefore needed to simulate a standard line interface. The interface 34 further includes 2:4-wire hybrid and off-hook detector functions. Isolation components are not generally needed because the handset 30 is preferably battery operated. In alternative embodiments of the present invention, the interface 34 further includes dual tone multi-frequency (DTMF) generator and decoder connection to the microcomputer 56 to support signaling and connection information transfer by the radio link. A ring generator on the handset would make it possible to handle an incoming call from the telephone line to the laptop computer without the use of wire connections to the laptop beyond the standard modem two wires.

The switch 42 is positioned to be able to bypass the handset transmit filter 40 and to stop the audio from the microphone 36 from being transmitted during data transmission from the laptop 32. The handset transmit filter 40 is bypassed during data transfers because the modem port of the laptop computer 32 is already conditioned. Further filtering would degrade the connection unnecessarily. The handset transmit filter 40 is needed to limit the otherwise broadband output of the microphone 36 to three KHz. Such filters are conventional, but switches to bypass them for data transfer are unknown in conventional cordless handsets. This applies equally to the receive filter 48, which may or may not be useful depending on the details of the modem receive filter in the laptop computer 32.

The switch 50 is not strictly necessary for the basic operation of the cordless handset 30, but its inclusion is preferred. Otherwise, an annoying audible data screech would be output by the speaker 54 during data reception by the laptop computer 32.

Outgoing data calls are initiated by the interface 34 detecting an off-hook condition of the laptop computer 32 and by the user's entry of a digit at the keypad 58. For example, the digits "8" or "9" commonly used in office telephones to get an outside line could be used to get attention from the base station 18.

Figure 3:
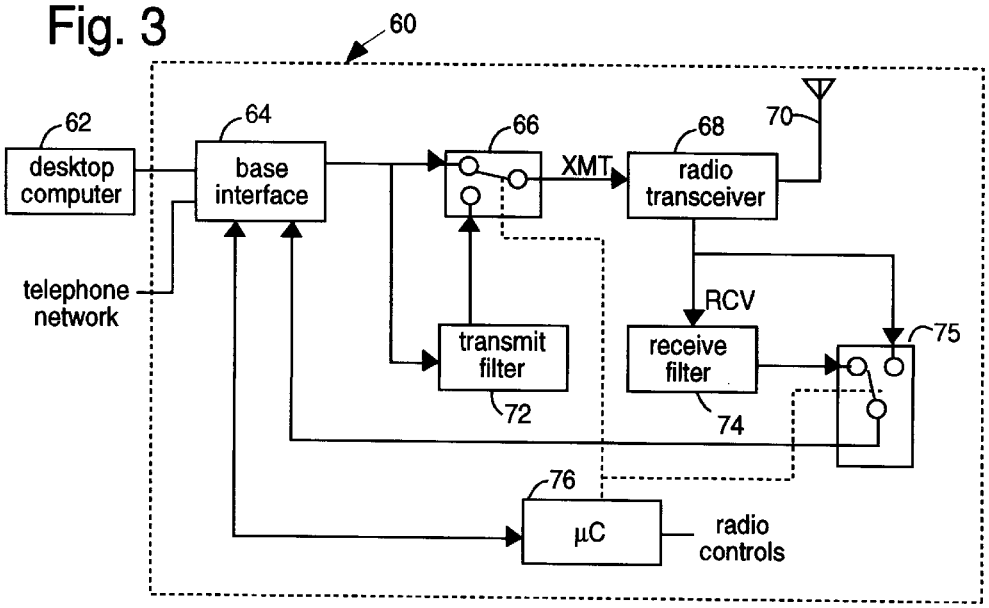

FIG. 3 illustrates a base station embodiment of the present invention referred to herein by the general reference numeral 60. The base station 60 is similar to the base station 18 of FIG. 1. A desktop computer 62, or other data processor, is connected to a base interface 64. The base interface 64 includes circuit devices to generate a holding DC current to simulate a standard line interface and is required by some conventional modems. It could also include a ring generator so that a call from the laptop to the desktop would be possible using no more than the standard two wire modem connection. It will be obvious to those skilled in the art that other implementations either need more wires for special signals, or need special signals and special means of detecting those signals within the modems. Automatic gain control, echo cancellation and data signal detection are all required in the base interface 64. If the system is data only then data signal detection is not required. Data signal detection can also be achieved in software in the microcomputer 76. In alternative embodiments of the present invention, the base interface 64 further includes 2:4-wire hybrid, off-hook detector functions, and/or a dual time multi-frequency (DTMF) generator and decoder to support signaling and connection information transfer through a switch 66, a radio transceiver 68 and an antenna 70, e.g., to support the RF link 16 between the laptop computer 14 and the desktop computer 20 (FIG. 1). A transmit filter 72 can be switched in and out of the transmit path by the switch 66. A receive filter 74 limits the audio noise bandwidth received from the radio transceiver 68. If the data signal is being routed to the desktop computer then it may be useful to bypass the receive filter 74 with an additional pole to switch 66, depending on the detail design of the modem receive filter in the desktop computer. Such additional pole to switch 66 is represented in FIG. 3 as a switch 75. A microcomputer 76 provides control over the radio channel and the switch 66. The microcomputer 76 can direct the base interface 64 to route calls in any combination amongst the telephone network, the desktop computer 62, and a remote cordless handset via the radio transceiver 68. Such routing is preferably accomplished at the direction of the user at a remote cordless handset, e.g., handset 12 in FIG. 1. The microcomputer 76 can also be used to detect special signals such as the data/voice signal as an alternate means to using a digital signal processor.

Automatic gain control and echo cancellation are needed in the base station 60 to optimize the radio channel connection. A modem handshake detector inside the digital signal processor 88 is necessary to help determine when automatic gain control and echo cancellation functions should be enabled, e.g., during voice traffic but not during data traffic. In addition, the modem handshake detector must determine when the local echo canceller should be trained and when it's adaptivity should by disabled. This function is critical to correct operation because most modems have echo cancellers of their own. The radio echo canceller 80 must not interfere with correct operation of the echo canceller in the modem in the laptop 32. Conventional analog cordless phone systems do not include such functions. Conventional automatic gain control, echo cancellation devices and modem handshake detectors and methods can be used, so describing their implementation further is not necessary.

The present invention includes a modification to a standard echo canceller algorithm. The echo canceller in the DSP 88 must be faster training than the modem echo canceller in order to prevent the two echo cancellers from interfering with each other's operation. At least twice the training rate is used for good operation. The present invention also takes advantage of the training signal generated by the laptop modem to train the echo canceller in the DSP 88. Thus a separate training signal generator is not required. An echo canceller is required in-line between the receiver side of the telephone network and the RF transmitter at the base station 18 or 60. Such echo canceller attenuates any near-end echo that might be added to the receive signal from the telephone line into the RF transmission. Uncontrolled, such echoes of the transmit signals going into the telephone line can exceed the receive signal level by an order of magnitude. The placement of the echo canceller at this point in the system is critical to making full use of very limited dynamic range of the RF link.

At one extreme, the echo cancellation prevents an overloading of the radio modulation that can introduce severe distortion. More usually, the echo cancellation simply helps to improve the communication channel signal-to-noise ratio. The connection between the base station 60 and the telephone network is made with a great deal of uncertainty about the impedance match being made. Further compounding the basic problem is the fact that the received signal will be much fainter than the transmitted signal. Only the directionality of the signals can be used to distinguish between them. A poor impedance match causes the larger transmit signal to be echoed back on top of the received signal. Conventional modems use automatic gain control and echo cancellers to address such problems. But when a cordless phone link is placed between a modem at a portable computer and the telephone line, the normal function of such automatic gain control and echo cancellers is in the wrong location to give the base radio transmitter to handset receiver link direction a clean signal for full dynamic range and maximum signal to noise ratio.

Figure 4:
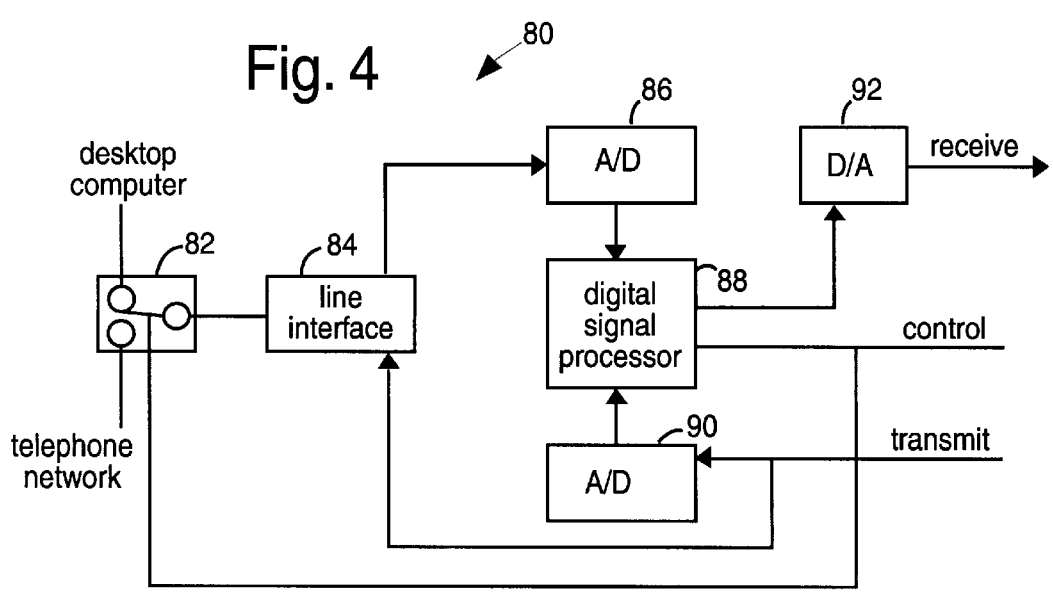

FIG. 4 shows a typical base interface unit 80, similar to the base interface 64 of FIG. 3. The base interface unit 80 includes a switch 82 to switch a line interface 84 between the desktop computer and the telephone network. The line interface 84 is essentially a 2:4-wire hybrid network that interfaces a 4-wire set with separate 2-wire transmit and receive pairs to a two-way 2-wire pair. Such hybrids are conventional and the line interface 84 is used in the conventional mode. An analog-to-digital converter (A/D) 86 in the receive channel connects to a digital signal processor (DSP) 88. Another analog-to-digital converter (A/D) 90 provides the DSP 88 with digital information derived from the transmit channel. A digital-to-analog converter (D/A) 92 is used by the DSP 88 to reconstruct an analog representation of the receive channel that has been processed for echo and gain. The elements 84, 86, 88, 90 and 92 form one possible implementation of a conventional echo canceller/automatic gain control hardware and software device as commonly described and practiced in industry.

Critical to the present invention is the combination of analog modulation on the radio, echo cancellation and automatic gain control between the telephone network and the base radio and a standard telephone interface jack to connect the handset to the laptop modem port. Such are minimally required for a data-only system connection to the telephone network. For a system with both data and voice, and a desktop computer, a switch to route the information is required at the base end to/from the desktop computer or the telephone line, a switch to bypass the radio transmit filter for data call, and a special signal so the radio link and base echo canceller/automatic gain control can be set for voice or data. Thus such echo cancellation is not necessary for voice.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

What is claimed is:

1. A wireless communication system, comprising:
   a remote station having a first radio frequency transceiver that provides for a radio link and that provides for a connection to a telephone interface of a modem;
   a base station having a second radio frequency transceiver that provides for operation with said radio link and that includes a connection for a telephone line;
   an echo canceller having training speed substantially faster than that of an echo canceller in an attached modem and that is connected between said telephone line and said base station radio frequency transceiver; and
   an automatic gain control circuit disposed between said telephone line and said base station radio frequency transceiver;
   wherein, analog modulation is used for information communicated by said radio frequency transceivers.

2. The system of claim 1, further comprising:
   a desktop computer connected to communicate data over said radio link;
   routing means for detecting whether information for the base station is to be routed to the desktop computer or to said telephone line; and
   connection means for switching the base station between the desktop computer and said telephone line.

3. The system of claim 1, further comprising:
   voice interfacing means for carrying voice signals over said radio link;
   discriminating means for detecting whether an input signal to be carried over said radio link is a data signal or a voice signal;
   channeling means for switching said voice and data signal to follow appropriate paths to their intended destinations; and
   bypassing means for including or not including a corresponding radio transmit or receive filters according to whether voice or data signals have been detected by the discriminating means.

4. The system of claim 1, further comprising:
   a desktop computer connected to communicate data over said radio link;
   routing means for detecting whether information for the base station is to be routed to the desktop computer or to said telephone line;
   connection means for switching the base station between the desktop computer and said telephone line;
   voice interfacing means for carrying voice signals over said radio link;
   discriminating means for detecting whether an input signal to be carried over said radio link is a data signal or a voice signal;
   channeling means for switching said voice and data signal to follow appropriate paths to their intended destinations; and
   bypassing means for including or not including a corresponding radio transmit or receive filters according to whether voice or data signals have been detected by the discriminating means.

5. A wireless communication system, comprising:
   a cordless telephone handset having a first radio frequency transceiver and connected to a microphone and speaker for voice communication over a radio frequency link;
   a first data port disposed in the cordless handset and providing for modem support and a corded connection of a first computer proximate to the cordless telephone handset;
   a handset interface with a 2:4-wire hybrid disposed in the cordless telephone handset and connected to the first data port;
   a first microcomputer-controlled switch disposed in the cordless telephone handset and connected to the handset interface to select between data signals from the first data port and voice signals from said microphone for transmission by said radio transceiver;
   a cordless telephone base station having a second radio frequency transceiver for operation with said radio link;
   a second data port disposed in the cordless telephone base station and providing for modem support and a corded connection of a second computer proximate to the cordless telephone base station;
   a base interface with a 2:4-wire hybrid disposed in the cordless telephone base station;
   a telephone line port disposed in the cordless telephone base station and providing for connection of the public switched telephone network (PSTN) to the base interface; and
   a second microcomputer-controlled switch disposed in the cordless base station and connected to select between the second data port and the telephone line port.

6. The system of claim 5, wherein:

the base interface further includes a digital signal processor for echo cancellation of data signals transferring only between the first and second computers via the cordless telephone handset and the cordless telephone base station.

7. The system of claim 5, wherein:

the base interface further includes a digital signal processor for automatic gain control of data signals transferring only between the first and second computers via the cordless telephone handset and the cordless telephone base station.

8. The system of claim 5, wherein:

the base interface further includes a digital signal processor for automatic gain control, echo cancellation and automatic data detection of signals transferring only between the first and second computers via the cordless telephone handset and the cordless telephone base station.

9. The system of claim 5, further comprising:

a transmit filter for limiting the bandwidth of signals provided by the base interface to said second radio transceiver; and a third microcomputer-controlled switch connected between the base interface and said second radio transceiver for selectively enabling the transmit filter.

10. A cordless telephone base station, comprising:

a radio frequency transceiver for communication with a cordless telephone handset over a radio link;

a data port providing for modem support and a corded connection of a nearby computer;

a base interface with a 2:4-wire hybrid;

a telephone line port providing for connection of the public switched telephone network (PSTN) to the base interface; and a microcomputer-controlled switch disposed in the cordless base station and connected to select between the data port and the telephone line port.

11. The system of claim 10, wherein:

the base interface further includes a digital signal processor for echo cancellation of data signals transferring only between said cordless telephone handset and said nearby computer.

12. The system of claim 10, wherein:

the base interface further includes a digital signal processor for automatic gain control of data signals transferring only between said cordless telephone handset and said nearby computer.

13. The system of claim 10, wherein:

the base interface further includes a digital signal processor for automatic gain control, echo cancellation and automatic data detection of signals transferring only between said cordless telephone handset and said nearby computer.

* * * * *